US008103415B2

(12) United States Patent
Sakai et al.

(10) Patent No.: US 8,103,415 B2
(45) Date of Patent: Jan. 24, 2012

(54) HEADREST APPARATUS FOR VEHICLE

(75) Inventors: Morio Sakai, Toyota (JP); Koji Aoki, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 691 days.

(21) Appl. No.: 12/205,179

(22) Filed: Sep. 5, 2008

(65) Prior Publication Data

US 2009/0069985 A1    Mar. 12, 2009

(30) Foreign Application Priority Data

Sep. 7, 2007   (JP) ................................. 2007-232121

(51) Int. Cl.
B60R 21/055 (2006.01)
B60N 2/427 (2006.01)
(52) U.S. Cl. .............. 701/49; 701/47; 701/45; 280/735; 280/728.1; 297/61; 297/216.12
(58) Field of Classification Search .................... 701/49, 701/45, 47; 280/737, 728.1, 735, 741; 180/271
See application file for complete search history.

(56) References Cited

U.S. PATENT DOCUMENTS

| 4,887,024 | A * | 12/1989 | Sugiyama et al. | 324/674 |
|---|---|---|---|---|
| 6,654,671 | B2 * | 11/2003 | Schubert | 701/1 |
| 6,761,403 | B2 | 7/2004 | Pal et al. | |
| 7,448,677 | B2 * | 11/2008 | Sakai et al. | 297/216.12 |
| 7,496,457 | B2 * | 2/2009 | Fujita et al. | 702/56 |
| 7,853,381 | B2 * | 12/2010 | Iyoda | 701/45 |
| 2005/0023810 | A1 * | 2/2005 | Basir et al. | 280/735 |
| 2007/0027599 | A1 | 2/2007 | Sakai et al. | |
| 2007/0168097 | A1 * | 7/2007 | Vanderley | 701/45 |
| 2007/0176473 | A1 * | 8/2007 | Sakai et al. | 297/216.12 |
| 2008/0004775 | A1 | 1/2008 | Iyoda | |
| 2008/0046147 | A1 * | 2/2008 | Cluff et al. | 701/45 |
| 2008/0276191 | A1 * | 11/2008 | Breed | 715/771 |
| 2009/0121526 | A1 * | 5/2009 | Akaike et al. | 297/216.12 |
| 2010/0314918 | A1 * | 12/2010 | Alexander et al. | 297/216.12 |
| 2011/0082626 | A1 * | 4/2011 | Foo et al. | 701/46 |

FOREIGN PATENT DOCUMENTS

| EP | 1 946 978 A1 | 7/2008 |
|---|---|---|
| JP | 2007-030676 | 2/2007 |
| JP | 2007-168752 | 7/2007 |

OTHER PUBLICATIONS

European Search Report issued Aug. 13, 2009 in corresponding European Patent Application No. 08163778.7.

* cited by examiner

Primary Examiner — Toan C To
Assistant Examiner — Karen A Beck
(74) Attorney, Agent, or Firm — Buchanan, Ingersoll & Rooney PC

(57) ABSTRACT

A headrest apparatus for a vehicle includes a headrest rear portion supported at a seatback, a headrest front portion movable between a fully closed position and a fully open position, a driving device for moving the headrest front portion, a capacitance sensor detecting a change in capacitance in association with an approach of the head of an occupant, and a controlling device for controlling the headrest front portion to move to the fully open position in response to information that a vehicle is approaching from the rear, the controlling device controlling the driving device to stop a movement of the headrest front portion when the head of the occupant is detected on the basis of a detection signal from the capacitance sensor, the controlling device including a first filter having a first cutoff frequency and a second filter having a second cutoff frequency lower than the first cutoff frequency.

7 Claims, 9 Drawing Sheets

F I G. 6
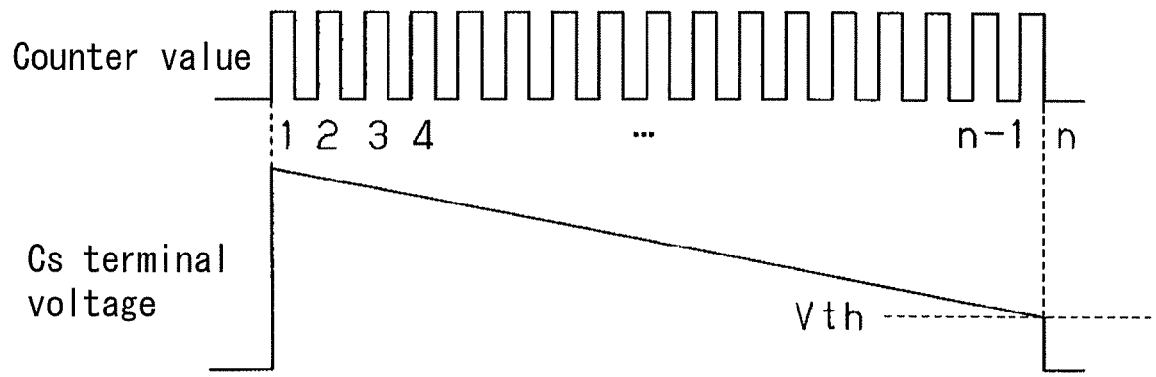

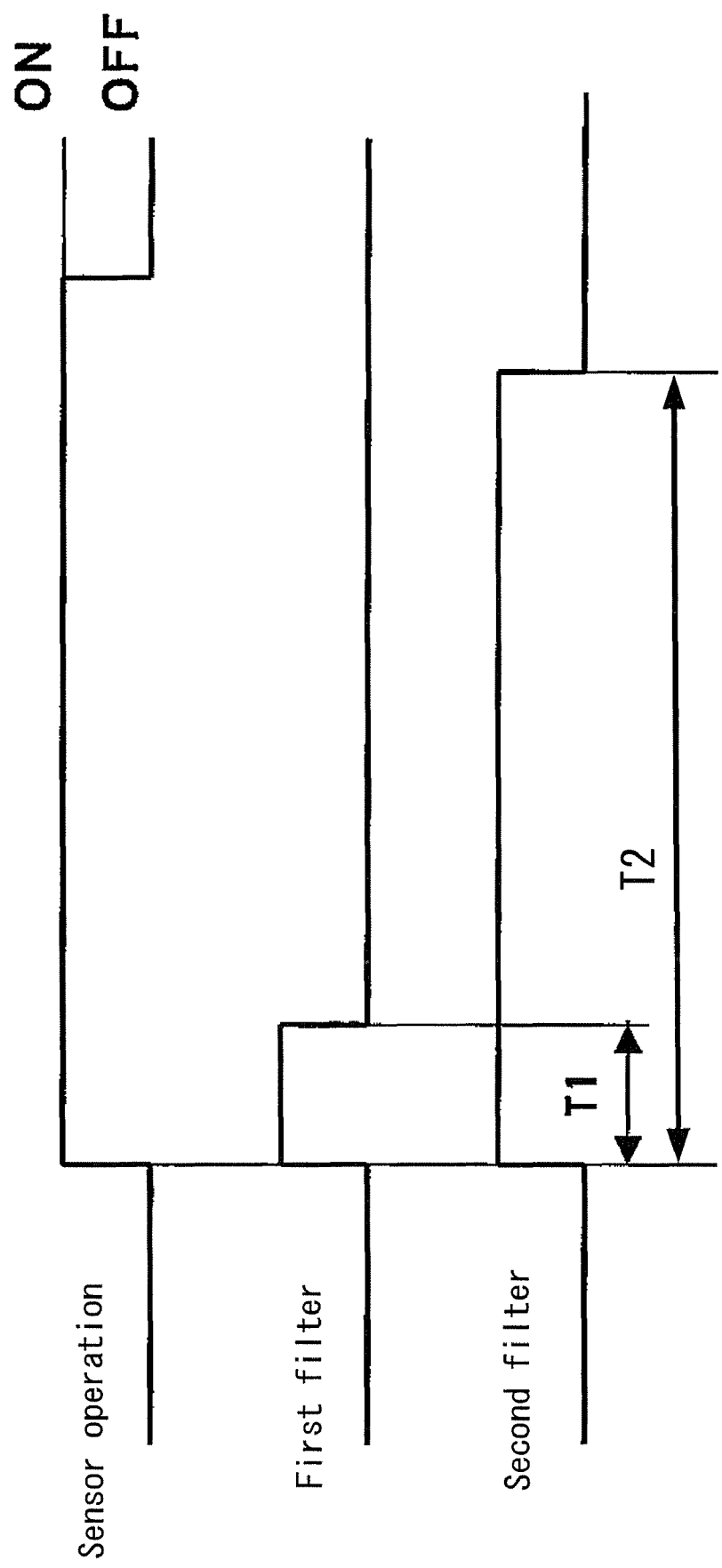

HEADREST APPARATUS FOR VEHICLE

CROSS REFERENCE TO RELATED APPLICATIONS

This application is based on and claims priority under 35 U.S.C. §119 to Japanese Patent Application No. 2007-232121, filed on Sep. 7, 2007, the entire content of which is incorporated herein by reference.

FIELD OF THE INVENTION

This invention generally relates to a headrest apparatus for a vehicle such as an automobile.

BACKGROUND

In view of safety at the time of a vehicle collision, a known seat apparatus for a vehicle is equipped with a mechanism for moving a headrest in a vehicle's forward direction for the purposes of protecting the head of a seated occupant in the event of a rear end collision (i.e., headrest apparatus for a vehicle). Such apparatus is disclosed in JP 2007-030676A and JP 2007-168752A. According to each of the headrest apparatuses disclosed, a headrest is moved in the forward direction relative to a seatback, thereby protecting the head of the seated occupant. Thus, in the event of or immediately before a rear end collision, an impact applied to the neck of the occupant may be decreased.

In this case, a capacitance sensor is used for stopping the movement of the headrest in response to the position of the occupant's head. For example, as shown in FIG. 2A, the capacitance sensor is provided at a front portion of the headrest (specifically, a surface facing the head of the occupant) for detecting a variation in capacitance that occurs in association with an approach of a detection object such as the head of an occupant to the front portion of the headrest. Then, the approach of the head of the occupant is determined on the basis of the variation in capacitance of the capacitance sensor. When the headrest approaches the head of the occupant as illustrated in FIG. 2B, a distance between the head and the headrest is shortened, which leads to an increase of a capacitance value of the capacitance sensor. As a result, it is detected that the headrest is positioned close to the head of the occupant.

The aforementioned headrest apparatus, which aims to protect the occupant in the vehicle, is required to surely detect the head of the occupant while the headrest is moved in the vehicle forward direction. In order to detect the head of the occupant, the capacitance sensor is oscillated via a drive signal with a high frequency in response to a command from a control unit so that a magnetic field is generated from the capacitance sensor in a direction where the head is positioned. Then, a variation in capacitance between the capacitance sensor and the detection object, i.e., the head of the occupant, is detected by a capacitance detection circuit.

The headrest apparatus is also desirably provided at rear seats in the vehicle so that the occupants not only in the front seats but also in the rear seats are protected in the event of or immediately before the rear end collision, thereby enhancing the safety. In this case, a distance between the headrest apparatus provided at the rear seat and a window provided at a rear portion of the vehicle is relatively short.

Lately, in order to improve the receiver sensitivity of a radio provided in the vehicle, a radio antenna is arranged in a window glass at the rear portion of the vehicle. In this case, when the headrest apparatus is provided at the rear seat, problems such as described below may occur. That is, when the capacitance sensor is driven via a drive signal with a high frequency, a noise is emitted outward from a line that drives the capacitance sensor (i.e., sensor line). This noise enters through the radio antenna arranged at the rear portion of the vehicle, which may cause discomfort to the occupant when he/she listens to the radio.

In order to decrease such radio noise, an operation time of the capacitance sensor may be minimized or a frequency of the drive signal for the capacitance sensor may be lowered as compared to a conventional drive frequency (for example, from several MHz to several KHz).

However, if the drive frequency is reduced as compared to the conventional one, the detection performance of the head of the occupant may be affected. The distance between the head and the capacitance sensor may be prevented from being surely detected, thereby causing the decrease in the detection performance. In this case, if a low-pass filter is simply conducted on the capacitance value detected by the capacitance sensor, the detection performance may decrease. As a result, countermeasures are required for the accurate detection of the detection object.

A need thus exists for a headrest apparatus for a vehicle which is not susceptible to the drawback mentioned above.

SUMMARY OF THE INVENTION

According to an aspect of the present invention, a headrest apparatus for a vehicle includes a headrest rear portion supported at a seatback, a headrest front portion movable between a fully closed position in which the headrest front portion is close to the headrest rear portion, and a fully open position in which the headrest front portion is away from the headrest rear portion, a driving device for moving the headrest front portion, a capacitance sensor detecting a change in capacitance in association with an approach of the head of an occupant, and a controlling device for controlling the headrest front portion to move to the fully open position in response to information that a vehicle is approaching from the rear, the controlling device controlling the driving device to stop a movement of the headrest front portion when the head of the occupant is detected on the basis of a detection signal from the capacitance sensor, the controlling device including a first filter having a first cutoff frequency and a second filter having a second cutoff frequency lower than the first cutoff frequency.

BRIEF DESCRIPTION OF THE DRAWINGS

The foregoing and additional features and characteristics of the present invention will become more apparent from the following detailed description considered with reference to the accompanying drawings, wherein:

FIG. 6 is an explanatory view illustrating a counter value of a counter and a capacitance value of the reference capacitor at a terminal voltage;

FIG. 9 is a timing chart illustrating an operation of the capacitance sensor and operating conditions of first and second filters.

DETAILED DESCRIPTION

An embodiment of the present invention will be explained with reference to the attached drawings.

Figure 1:
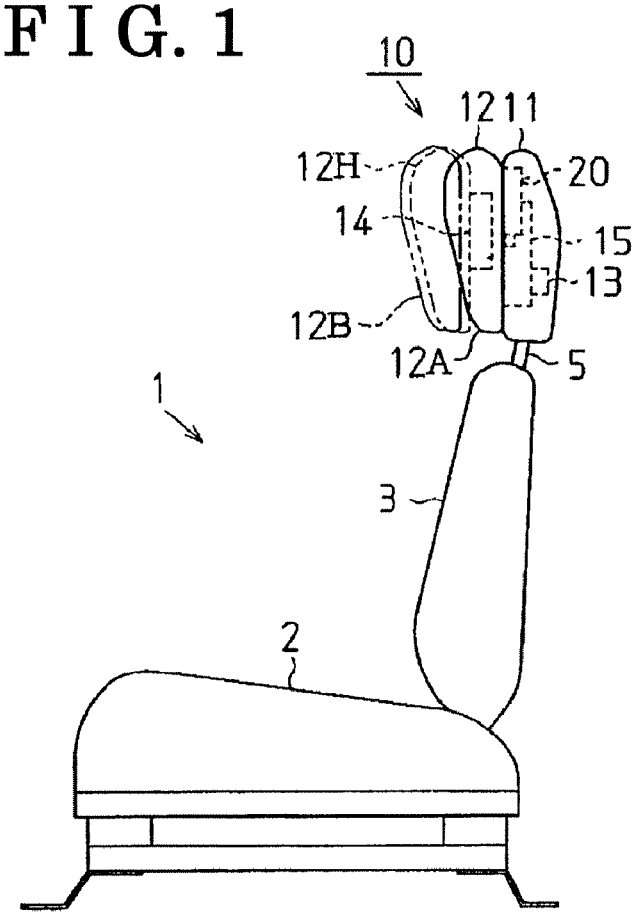
FIG. 1 is a side view of a vehicle seat in which a headrest apparatus for a vehicle according to an embodiment of the present invention is used.

FIG. 1 is a side view of a vehicle seat 1 in which a headrest apparatus for a vehicle according to the present embodiment is used. The vehicle seat 1 is arranged at least at one of a driver seat, a passenger seat, a rear seat, and the like. As illustrated in FIG. 1, the vehicle seat 1 includes a seat cushion 2, a seatback 3 supported at the seat cushion 2 so as to be tiltable relative thereto, and a headrest apparatus for a vehicle 10 (herein after simply referred to as a "headrest apparatus").

The headrest apparatus 10 includes a headrest rear portion 11, a headrest front portion 12, a motor 13 serving as driving means for moving the headrest front portion 12, a capacitance sensor 14, and an electronic control unit (hereinafter referred to as an "ECU") 20 serving as controlling means for controlling a driving of the motor 13.

The headrest rear portion 11 is supported at a headrest stay 5 provided at an upper end portion of the seatback 3. The headrest front portion 12 is movable between a fully closed position 12A where the headrest front portion 12 is close to and in contact with the headrest rear portion 11 as illustrated by a solid line in FIG. 1, and a fully open position 12B where the headrest front portion 12 is away from the headrest rear portion 11 as illustrated by a chain double-dashed line in FIG. 1. While a vehicle is in a usual moving state, the headrest front portion 12 is in the fully closed position 12A.

A driving mechanism 15 is arranged between the headrest rear portion 11 and the headrest front portion 12. The driving mechanism 15 is elongated or retracted by the driving of the motor 13 so that the headrest front portion 12 is able to move close to or move away from the headrest rear portion 11.

The capacitance sensor 14 having a flexible sheet shape and provided at the headrest front portion 12 has a known structure of detecting a change in capacitance, which is caused in response to a distance from a detection object such as the head of an occupant. According to the capacitance sensor 14, a detected capacitance value increases as the detection object such as the head of the occupant approaches the capacitance sensor 14.

The ECU 20 controls the motor 13 in such a manner that the headrest front portion 12 moves from the fully closed position 12A towards the fully open position 12B in the event of or immediately before a rear end collision and then returns to the original fully closed position 12A.

Figure 2A:
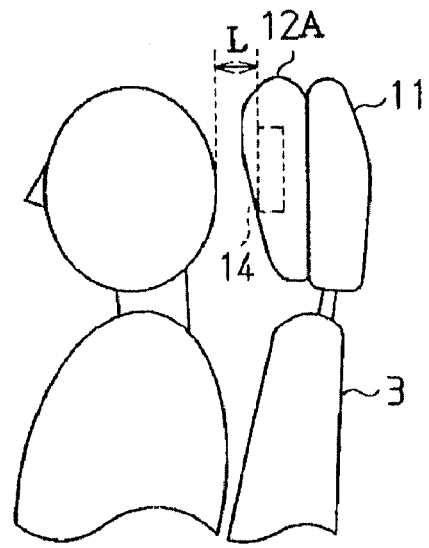
FIG. 2A is a side view illustrating a state in which a headrest front portion is in a fully closed position.
Figure 2B:
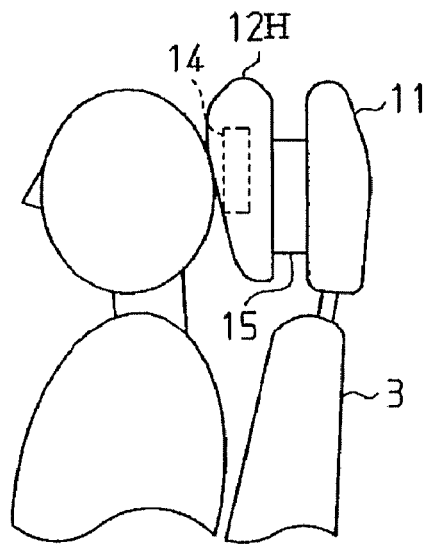
FIG. 2B is a side view illustrating a state in which the headrest front portion is moved forward.

In addition, the ECU 20 detects on the basis of a detected signal from the capacitance sensor 14 that the capacitance sensor 14 is positioned close to the head of the occupant. Specifically, when the ECU 20 controls the headrest front portion 12 to move from the fully closed position 12A as illustrated in FIG. 2A towards the fully open position 12B, the ECU 20 compares an amount of change in a capacitance detected by the capacitance sensor 14 and a predetermined threshold value. In the cases where the detected amount of change is larger than the threshold value, it is determined that the headrest front portion 12 is positioned close to the head of the occupant. The ECU 20 then brings the headrest front portion 12 to stop at a stop position 12H illustrated in FIG. 2B. When the approach of the head of the occupant is not detected, the ECU 20 brings the headrest front portion 12 to move up to the fully open position 12B.

Next, a system structure of the headrest apparatus 10 will be explained.

Figure 3:
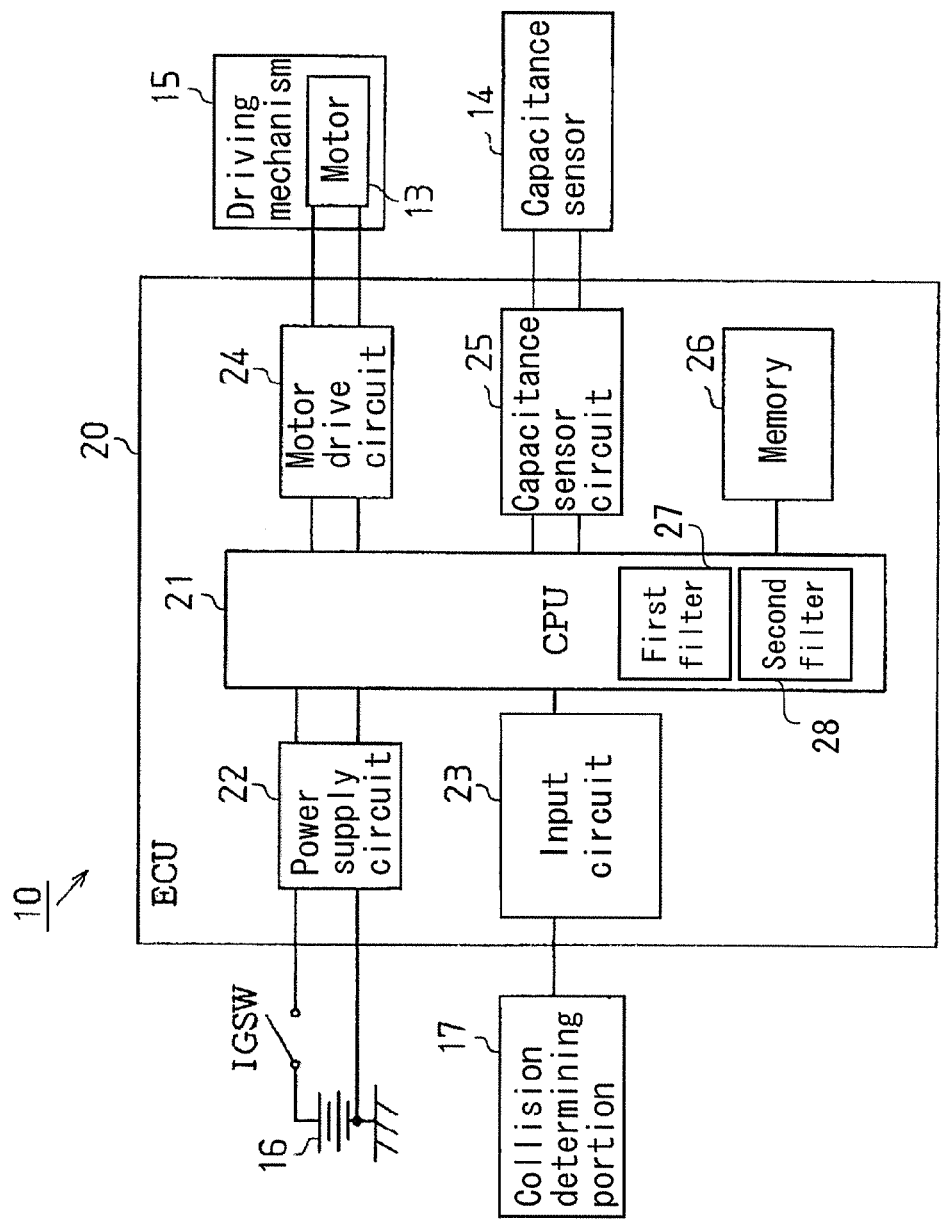
FIG. 3 is a block diagram of a system structure of the headrest apparatus according to the embodiment of the present invention.

As illustrated in FIG. 3, the headrest apparatus 10 includes the ECU 20, the driving mechanism 15 having the motor 13 connected to the ECU 20, the capacitance sensor 14 that detects the head of the occupant, a power supply unit (battery) 16 for supplying a driving power, a collision determining portion 17 for detecting a vehicle in the rear (i.e., following vehicle) and determining a risk of a rear end collision, and the like.

The ECU 20 includes a CPU 21, a power supply circuit 22, an input circuit 23, a motor drive circuit 24, a capacitance sensor circuit 25, a memory 26, and the like. The CPU 21 performs a calculation procedure based on a program stored beforehand. The power supply circuit 22 is connected to the CPU 21 so as to supply a constant voltage such as 5V to the CPU 21. The input circuit 23 inputs information on a collision of a vehicle approaching from the rear. The motor drive circuit 24 drives the motor 13. The capacitance sensor circuit 25 detects the capacitance by electrically charging and discharging the capacitance sensor 14. The memory 26 stores necessary information during the programming.

The CPU 21 is connected to the power supply unit 16 by means of an ignition switch (IGSW). When the ignition switch is turned on, power (for example, 12V) is supplied from the power supply unit 16 through the power supply circuit 22.

Further, the CPU 21 inputs vehicle information such as a vehicle approach from the rear from the collision determining portion 17 through the input circuit 23. The collision determining portion 17 is connected to a radar (not shown) provided at a bumper (not shown) at a rear portion of the vehicle. The collision determining portion 17 inputs a signal from the radar to comprehensively evaluate a relative speed and a distance to a following vehicle, and a speed of the present vehicle. The collision determining portion 17 determines a risk of a rear end collision, i.e., for example, whether or not the following vehicle is about to collide against the present vehicle. Then, that determination result is output to the input circuit 23. The CPU 21 is connected to the motor 13 by means of the motor drive circuit 24 so as to drive the motor 13 by controlling the motor drive circuit 24.

The CPU 21 is also connected to the capacitance sensor 14 by means of the capacitance sensor circuit 25 so as to oscillate the capacitance sensor 14 and to input a capacitance value detected by the capacitance sensor 14. Then, the CPU 21 detects a capacitance state of the capacitance sensor 14, i.e. a capacitance change per unit moving distance (specifically, a unit moving distance of the headrest front portion 12). The CPU 21 detects a capacitance changer per unit moving distance of the capacitance sensor 14 at a predetermined timing and changes the threshold value for detecting the head of the occupant based on the detected result.

Figure 4:
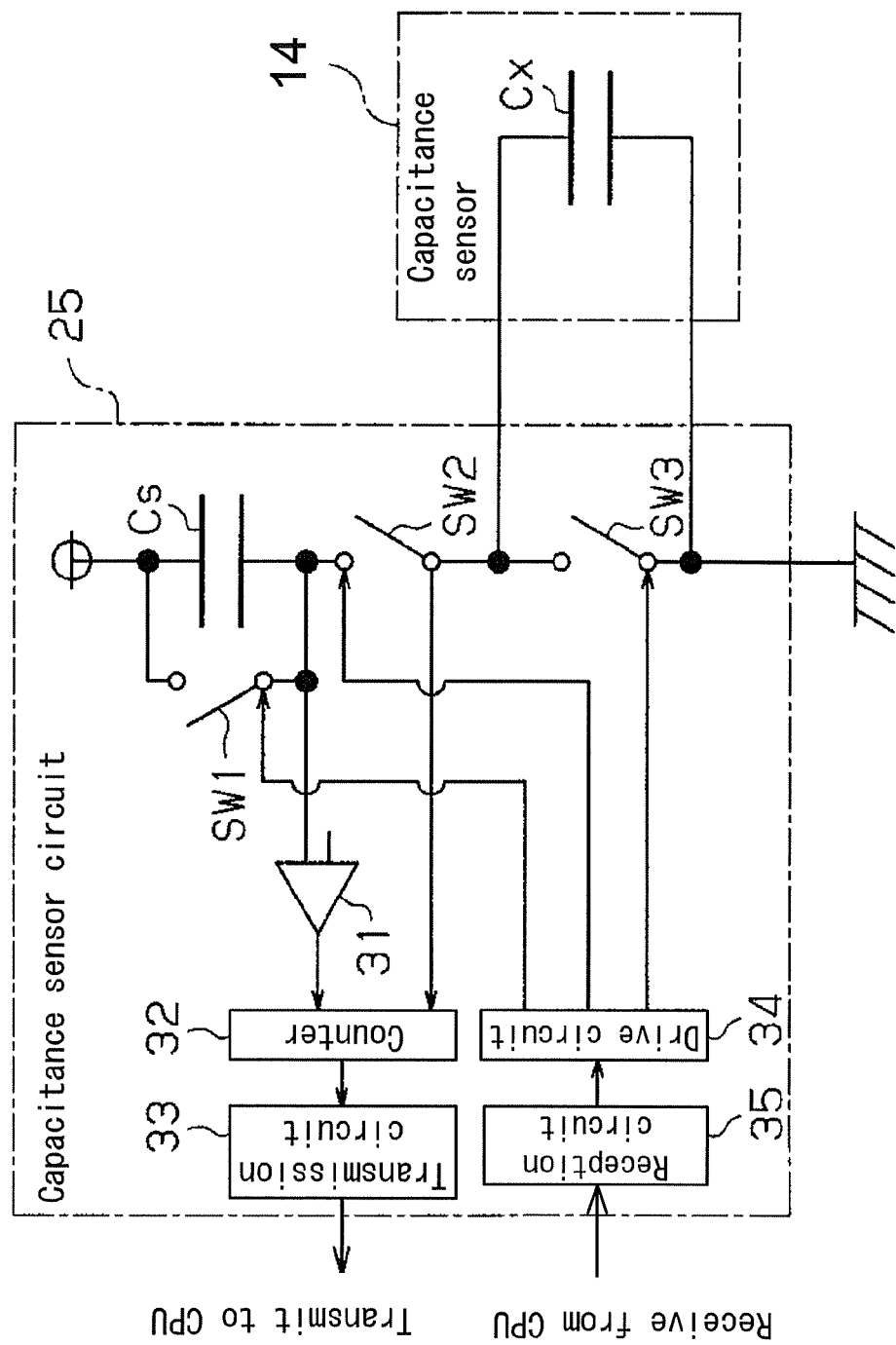
FIG. 4 is a block diagram illustrating a capacitance sensor circuit and a capacitance sensor illustrated in FIG. 3.

The capacitance sensor circuit 25 and the capacitance sensor 14 will be explained in detail with reference to FIG. 4. In FIG. 4, a reference capacitor Cs constituting the capacitance sensor circuit 25 and a sensor electrode Cx constituting the capacitance sensor 14 are connected to an AC (alternating-current) source.

A charge switch SW1 is connected in parallel to the reference capacitor Cs. When the charge switch SW1 is turned on, the reference capacitor Cs is electrically charged. A comparison circuit 31 is connected to an output terminal of the reference capacitor Cs. Further, a transmission circuit 33 is connected to an output terminal of the comparison circuit 31 via a counter 32 so as to transmit a detection signal to the CPU 21.

A charge-transfer switch SW2 is connected between the reference capacitor Cs and the sensor electrode Cx. When the charge-transfer switch SW2 is turned on, a portion of an electric charge of the reference capacitor Cs is transferred to the sensor electrode Cx. An output terminal of the charge-transfer switch SW2 is connected to the counter 32. Further, an electrode discharge switch SW3 is connected to the sensor electrode Cx. When the electrode discharge switch SW3 is turned on, the electric charge of the sensor electrode Cx is discharged.

The charge switch SW1, the charge-transfer switch SW2, and the electrode discharge switch SW3 are all connected via a drive circuit 34 that drives the switches SW1, SW2, and SW3 to a reception circuit 35 that receives a signal such as a drive signal from the CPU 21. The switches SW1, SW2, and SW3 are turned on and off depending on the drive signal output from the CPU 21.

Next, operations of the capacitance sensor circuit 25 and the capacitance sensor 14 will be explained below.

Figure 5A:
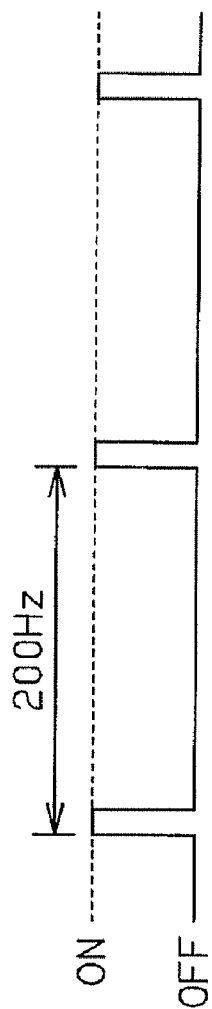
FIG. 5 is a timing chart illustrating on and off timings of switches and a capacitance value of a reference capacitor.
Figure 5B:

When the charge switch SW1 is turned on as illustrated in FIG. 5A, the reference capacitor Cs is charged with the power supply voltage as illustrated in FIG. 5B. Then, the charge switch SW1 is turned off. The charge switch SW1 is maintained in the ON state for a predetermined time period at 200 Hz, for example.

Figure 5C:
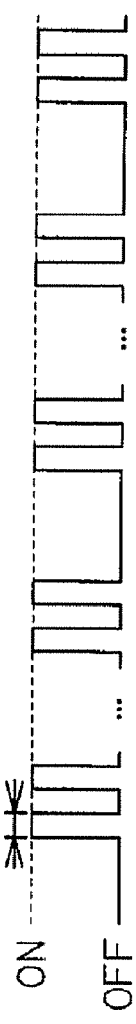
Figure 5D:
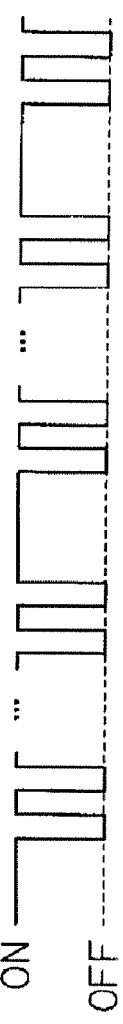

When the electrode discharge switch SW3 is turned on as illustrated in FIG. 5D, the electric charge of the sensor electrode Cx is discharged. When the electrode discharge switch SW3 is turned off while the charge-transfer switch SW2 is turned on as illustrated in FIGS. 5C and 5D, the reference capacitor Cs and the sensor electrode Cx are connected to each other. Then, a portion of the electric charge of the reference capacitor Cs is transferred to the sensor electrode Cx. Accordingly, the sensor electrode Cx is electrically charged or discharged depending on the turning on and off of each of the charge-transfer switch SW2 and the electrode discharge switch SW3. The number of turning on and off of the charge-transfer switch SW2 is counted by the counter 32 as illustrated in FIG. 6. Each of the charge-transfer switch SW2 and the electrode discharge switch SW3 is in the ON state at 1 MHz, for example.

In the cases where the head of the occupant approaches the capacitance sensor 14 provided at the headrest front portion 12 as illustrated in FIG. 2A, the capacitance value of the capacitance sensor 14 increases. The amount of electric charge transferred from the reference capacitor Cs to the sensor electrode Cx also increases. Thus, the voltage value of the reference capacitor Cs falls below a reference voltage value (i.e., threshold value) Vth within a short time as compared to a normal state (i.e., where the head of the occupant is not detected). The counter value of the counter 32 when the head of the occupant approaches the capacitance sensor 14 is smaller than that in the normal state. Accordingly, the CPU 21 can detect the approach of the head of the occupant towards the headrest front portion 12.

According to the aforementioned structure, the CPU 21 changes the threshold value Vth at predetermined time intervals and writes the threshold value Vth in the memory 26 each time. When the CPU 21 detects that the following vehicle has collided against the present vehicle or is about to collide against the present vehicle, the CPU 21 moves the headrest front portion 12 in the vehicle forward direction and at the same time reads out the threshold value Vth stored in the memory 26 for detecting an approach of the head of the occupant by the capacitance sensor 14.

A change of the threshold value performed by the CPU 21 will be explained below.

The amount of change in capacitance when the capacitance sensor 14 moves in the forward direction and approaches the head of the occupant varies depending on a capacitance state of the capacitance sensor 14. Thus, the CPU 21 periodically detects the capacitance state of the capacitance sensor 14 and specifies the threshold value based on that detected result.

Figure 7:
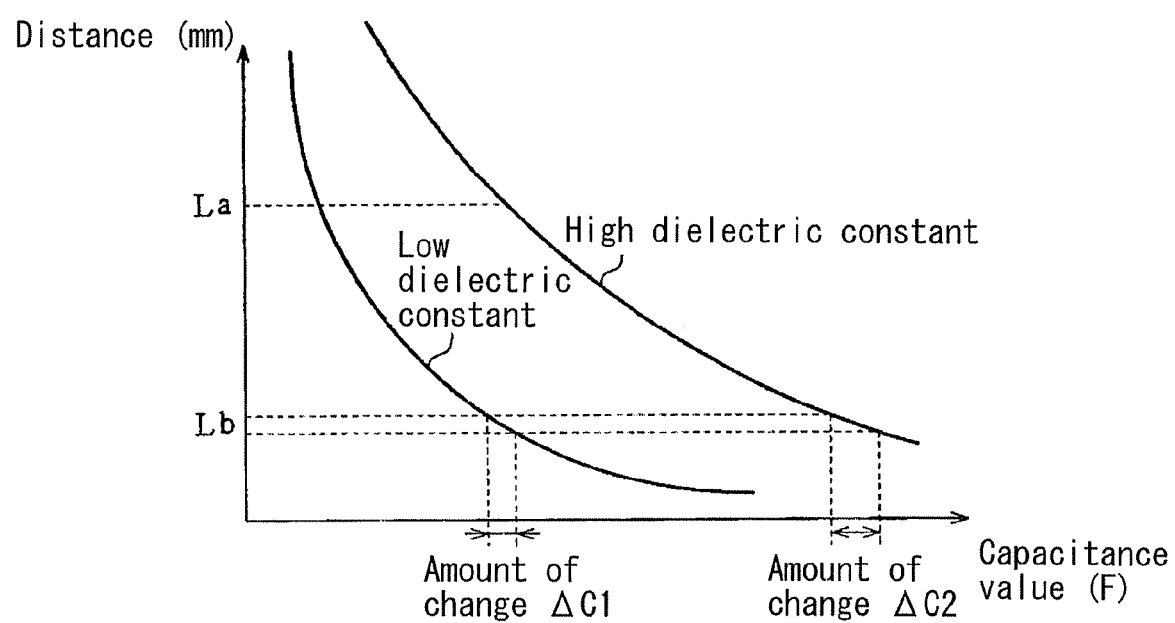
FIG. 7 is a graph illustrating a relationship between a capacitance value and a distance depending on a difference in dielectric constant.
Figure 10A:
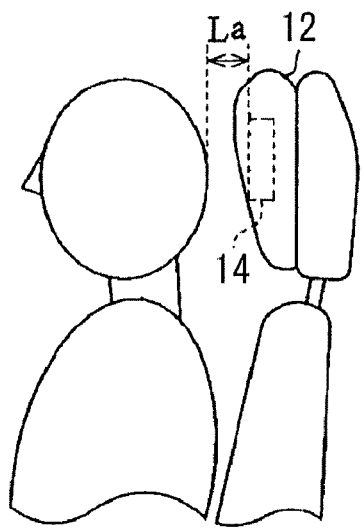
FIGS. 10A and 10B are side views each illustrating an operation of the headrest front portion.
Figure 10B:
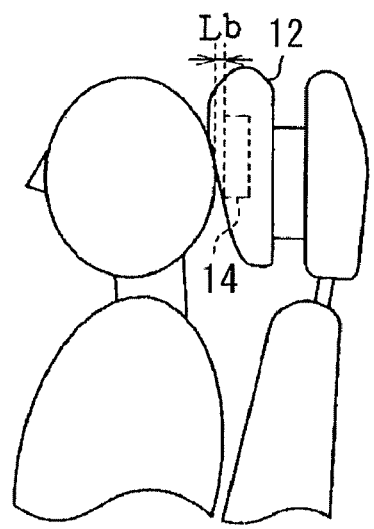

For example, as illustrated in FIG. 7, the amount of change in capacitance per unit moving distance is large (for example, an amount of change $\Delta C2$) when a dielectric constant of a space (i.e., distance L in FIG. 2A) defined between the capacitance sensor 14 and the head of the occupant is high as compared to a case in which the dielectric constant of the space is low under a condition of the same distance (for example, a distance Lb in FIG. 10B) by which the headrest front portion 12 moves (at this time, an amount of change in capacitance per unit moving distance is $\Delta C1$). Thus, the CPU 21 detects the capacitance change per unit moving distance of the capacitance sensor 14 beforehand so as to change the threshold value Vth based on the detected result. Since the amount of change in capacitance is large when the dielectric constant is high, at that time the threshold value is specified to be high, as compared to a case in which the dielectric constant is low.

Further, according to the present embodiment, the CPU 21 detects a driving voltage of the motor 13 by means of a voltage of the power supply unit 16 and changes the threshold value Vth based on the detected result. Since a speed of the motor 13 is high when the driving voltage of the motor 13 is large, the amount of change in capacitance of the capacitance sensor 14 increases.

Specifically, the CPU 21 specifies the threshold value Vth based on a data table (not shown), which is defined by a detected capacitance value of the capacitance sensor 14 and the driving voltage of the motor 13. The threshold value Vth is specified to increase as the capacitance of the capacitance sensor 14 increases, and as the driving voltage of the motor 13 increases.

According to the present embodiment, the CPU 21 performs a process for changing the threshold value at predetermined time intervals, and also performs a process for detecting the occupant's head at a time of an operation of the headrest front portion 12.

A control process performed by the CPU 21 provided at the ECU 20 of the headrest apparatus 10 will be explained with reference to FIG. 8. In the following explanation, each step to which the program proceeds will be simply illustrated as "S". According to the present embodiment, the CPU 21 performs an initial process in S100. Specifically, operation checks of a memory inside of the CPU 21 and the memory 26 outside of the CPU 21 are conducted. In addition, after the setting of an initial value to the required memory, and the like, an initial check of whether or not a system error occurs in the headrest apparatus 10 is conducted. Then, the program proceeds to S110 to input information from the collision determining portion 17 to determine whether or not a vehicle is approaching from the rear. For example, the collision determining portion 17 detects the approach of the following vehicle to the present vehicle and determines a risk of a rear end collision (for example, a distance to the following vehicle, a relative speed, a time to the collision). Such information is input via the input circuit 23 to the CPU 21 as rear approach information. In the case that the rear approach information is not present in S110, the program does not proceed further until the rear approach information is input. When the rear approach information is input, the process proceeds to S120.

In S120, the motor 13 is turned on so as to start the headrest front portion 12 to move in the vehicle forward direction.

The program then proceeds to S130 in which it is determined whether or not the capacitance sensor 14 is being operated (i.e., the sensor 14 is in the ON state). When it is determined that the capacitance sensor 14 is being operated, the program proceeds to S140. On the other hand, when it is determined that the capacitance sensor 14 is not operated (i.e., the sensor 14 is in the OFF state), the program proceeds to S170 where the capacitance sensor 14 is driven to operate. In S180, a first filter 27 and a second filter 28 are operated at the same time as illustrated in FIG. 9. Afterwards, the program returns to S110 and proceeds to following steps.

The first filter 27 and the second filter 28 will be explained in detail below.

The first filter 27 is a low-pass filter having a first cutoff frequency fc1 (for example, in a range from 7 Hz to 10 Hz, desirably, 9 Hz) so as to eliminate an exogenous noise. Even when the exogenous noise is superimposed on the detection signal from the capacitance sensor 14, the first filter 27 eliminates the exogenous noise via the first cutoff frequency fc1 so that a desired signal can be accurately detected from the capacitance sensor 14.

The second filter 28 is a low-pass filter having a second cutoff frequency fc2 (for example, in a range from 3 Hz to 5 Hz, desirably, 4 Hz) lower than the first cutoff frequency fc1 so that the second filter 27 is configured to be less sensitive for detecting the head of the occupant than the first filter 28 but to eliminate more exogenous noise than the first filter 27. By the usage of the second filter 28, a desired signal can be accurately detected from the capacitance sensor 14 through elimination of the exogenous noise.

Figure 8:
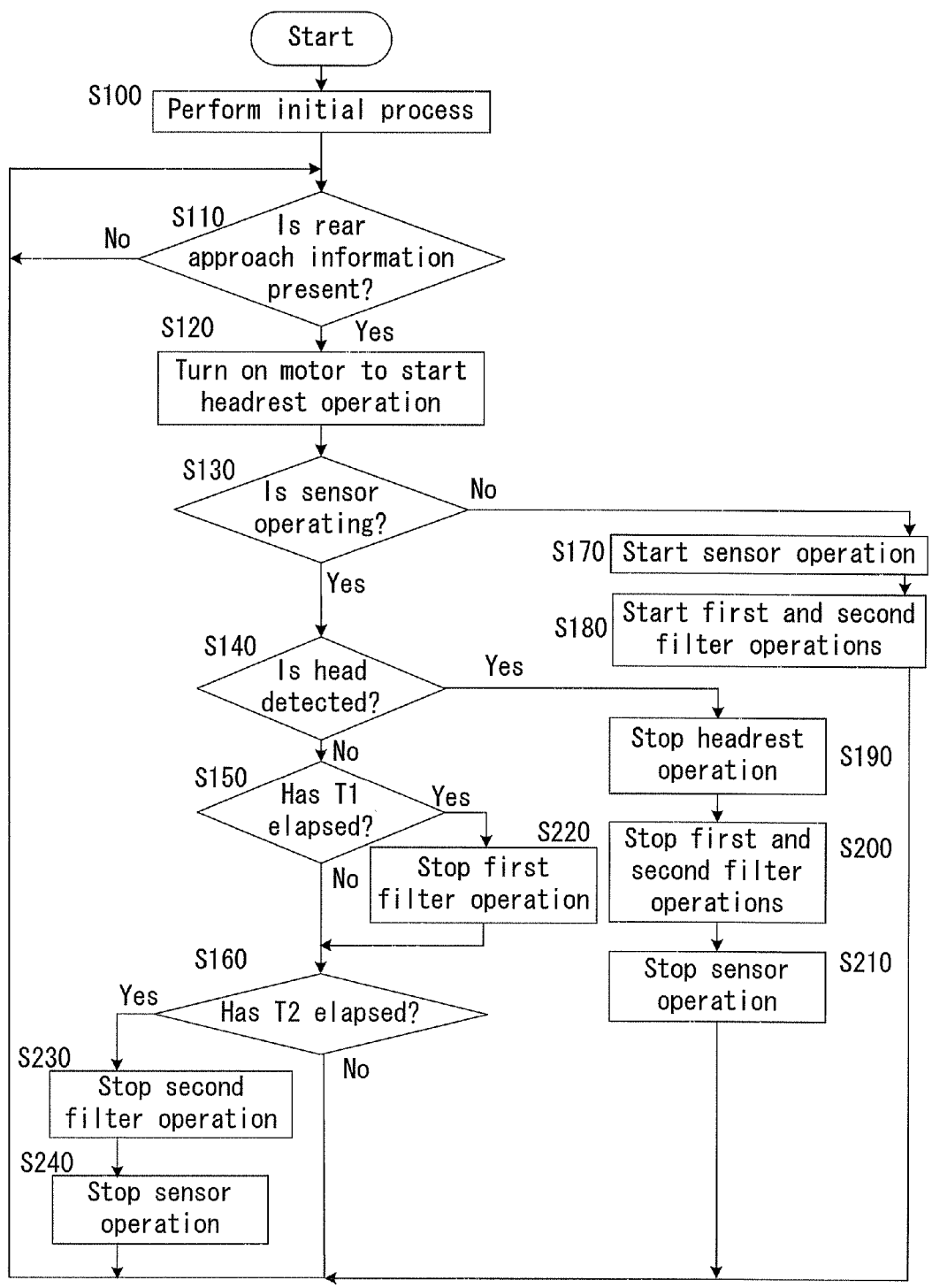
FIG. 8 is a flowchart for detecting the head of an occupant by a control unit.

Back to FIG. 8, when it is determined that the capacitance sensor 14 is being operated in S130, the program proceeds to S140 in which it is determined whether or not the head of the occupant is detected. When is it determined that the head is not detected in S140, the program proceeds to S150. On the other hand, when it is determined that the head is detected in S140, the movement of the headrest front portion 12 in the forward direction is stopped in S190. In S200, the operations of the first filter 27 and the second filter 28 are stopped. Then, in S210, the operation of the capacitance sensor 14 is stopped in S210. Afterwards, the program returns to S110 to repeat the aforementioned routine.

Meanwhile, when it is determined that the head is not detected in S140, the program proceeds to S150 where it is determined whether or not a predetermined time (for example, a first predetermined time T1: 100 msec) has elapsed from the operation start of the capacitance sensor 14. When it is determined that the first predetermined time T1 has elapsed in S150, the program proceeds to S220 where the operation of the first filter 27 is stopped as illustrated in FIG. 9. The program then proceeds to S160 where it is determined whether or not a predetermined time longer than the time defined in S150 (for example, a second predetermined time T2: 1 sec) has elapsed. On the other hand, when it is determined that the first predetermined time T1 has not elapsed in S150, the program proceeds to S160. At this time, since it is determined that the first predetermined time T1 has not elapsed in S150, the second predetermined time T2 longer that the first predetermined time T1 has not elapsed in S160. Thus, the negative determination is made in S160. The program returns to S110 to repeat the routine. On the other hand, when it is determined that the second predetermined time T2 has elapsed in S160 after the determination in S220, the program proceeds to S230 in which the operation of the second filter 28 is stopped and then, in S240, the operation of the capacitance sensor 14 is stopped. The program returns to S110 to repeat the process from S110 at predetermined time intervals.

According to the present embodiment, two filters of the first filter 27 having the first cutoff frequency fc1 and the second filter 28 having the second cutoff frequency fc2 lower than the first cutoff frequency fc1 are used for changing the filtering sensitivity. Accordingly, even when the detection sensitivity of the capacitance sensor 14 decreases, the head of an occupant can be accurately detected while eliminating the exogenous noise regardless of the driving state of the capacitance sensor 14.

According to the present embodiment, two filters having different cutoff frequencies are used for detecting the head of an occupant. Alternatively, more than two filters having different cutoff frequencies may be used for detecting the head of the occupant.

In addition, according to the present embodiment, the head of an occupant is detected by the capacitance sensor 14. Alternatively, a portion of the body of the occupant such as the shoulder and the upper body may be detected.

According to the aforementioned embodiment, the ECU 20 uses both the first filter 27 and the second filter 28 having different cutoff frequencies from each other, thereby surely detect the head of the occupant while eliminating the exogenous noise. In this case, the headrest apparatus according to the present embodiment can surely detect the detection object such as the head of the occupant by means of the capacitance sensor 14 without being affected by the driving state thereof.

Further according to the aforementioned embodiment, the ECU 20 controls the first filter 27 and the second filter 28 to start operating at the same time as an operation start of the capacitance sensor 14.

The operations of the first and second filters 27 and 28 are started at the same time as the start of the operation of the capacitance sensor 14. That is, multiple filters having different cutoff frequencies from each other such as the first and second filters 27 and 28 are used. For example, since the position of the head of the occupant relative to the headrest front portion 14 is not clearly determined immediately after the start of the capacitance sensor 14, i.e., while the head of the occupant is likely to be positioned close to the headrest front portion 14, the first filter 27 having the better detection sensitivity than the second filter 28 is used. In addition, the operation of the second filter 28 that detects the approach of the head to the headrest front portion 14 is started at the same time as the first filter 27, thereby surely detecting the position of the head of the occupant.

Furthermore, according to the aforementioned embodiment, the ECU 20 detects the head of the occupant within the predetermined time T1 by using the first filter 27.

The ECIJ 20 detects the head of the occupant by means of the first filter 27 for the first predetermined time T1 immediately after the start of the operation of the capacitance sensor 14. As a result, the head of the occupant is surely detectable without delay.

Furthermore, according to the aforementioned embodiment, the ECU 20 controls the first filter 27 to operate for the predetermined time T1 and, after the elapse of the predetermined time T1, detects the head of the occupant by using the second filter 28.

The ECU 20 controls the first filter 27 to operate for the first predetermined time T1 and to operate the second filter 28 for the second predetermined time T2 longer than the first predetermined time T1. As a result, after the operation of the first filter 27 for the detection of the head of the occupant, the detection of the head of the occupant is achieved by the second filter 28 that can eliminate more exogenous noise.

Furthermore, according to the aforementioned embodiment, the first filter 27 is a low-pass filter specified to be a predetermined frequency for eliminating an exogenous noise.

Furthermore, according to the aforementioned embodiment, the first filter 27 eliminates an exogenous noise by means of the first cutoff frequency fc1.

Furthermore, according to the aforementioned embodiment, the first cutoff frequency fc1 is specified in a range from 7 Hz to 10 Hz.

Furthermore, according to the aforementioned embodiment, the second cutoff frequency fc2 is specified in a range from 3 Hz to 5 Hz.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A headrest for a vehicle, comprising:
a headrest rear portion supported at a seatback;
a headrest front portion movable between a fully closed position in which the headrest front portion is close to the headrest rear portion, and a fully open position in which the headrest front portion is away from the headrest rear portion;
driving means for moving the headrest front portion;
a capacitance sensor detecting a change in capacitance in association with an approach of the head of an occupant;
controlling means for controlling the headrest front portion to move to the fully open position in response to information that a vehicle is approaching from the rear, the controlling means controlling the driving means to stop a movement of the headrest front portion when the head of the occupant is detected on the basis of a detection signal from the capacitance sensor, the controlling means including a first filter having a first cutoff frequency and a second filter having a second cutoff frequency lower than the first cutoff frequency; and
wherein the controlling means control the first filter and the second filter to start operating at the same time as an operation start of the capacitance sensor.

2. A headrest apparatus according to claim 1, wherein the controlling means detect the head of the occupant within a predetermined time by using the first filter.

3. A headrest apparatus according to claim 2, wherein the controlling means control the first filter to operate for the predetermined time and, after the elapse of the predetermined time, detect the head of the occupant by using the second filter.

4. A headrest apparatus according to claim 1, wherein the first filter is a low-pass filter specified to be a predetermined frequency for eliminating an exogenous noise.

5. A headrest apparatus according to claim 1, wherein the first filter eliminates an exogenous noise by means of the first cutoff frequency.

6. A headrest apparatus according to claim 1, wherein the first cutoff frequency is specified in a range from 7 Hz to 10 Hz.

7. A headrest apparatus according to claim 1, wherein the second cutoff frequency is specified in a range from 3 Hz to 5 Hz.

* * * * *